United States Patent [19]

Valaas

[11] Patent Number: 4,646,242
[45] Date of Patent: Feb. 24, 1987

[54] AIRCRAFT AUTOMATIC BRAKING SYSTEM

[75] Inventor: Andrew M. Valaas, Bellevue, Wash.

[73] Assignee: The Boeing Company, Seattle, Wash.

[21] Appl. No.: 608,049

[22] PCT Filed: Jan. 27, 1984

[86] PCT No.: PCT/US84/00118
§ 371 Date: Jan. 27, 1984
§ 102(e) Date: Jan. 27, 1984

[87] PCT Pub. No.: WO85/03367
PCT Pub. Date: Aug. 1, 1985

[51] Int. Cl.⁴ .......................... B60T 8/04; G06F 15/48
[52] U.S. Cl. .................................... 364/426; 364/428;
303/93; 244/111
[58] Field of Search .................. 364/426, 428, 430;
244/111, 81, 110 A, 79; 303/92, 93, 97

[56] References Cited
U.S. PATENT DOCUMENTS

| | | | |
|---|---|---|---|
| 2,942,864 | 6/1960 | Sikora | 73/493 |
| 3,598,453 | 8/1971 | Riordan | 303/21 |
| 3,926,479 | 12/1975 | Bissell et al. | 244/111 X |
| 4,007,970 | 2/1977 | Romero | 244/111 X |
| 4,076,331 | 2/1978 | De Vlieg | 303/93 |
| 4,105,258 | 8/1978 | Bornfleth | 303/93 |
| 4,410,153 | 10/1983 | Romero | 244/111 |

Primary Examiner—Felix D. Gruber
Assistant Examiner—Thomas G. Black
Attorney, Agent, or Firm—Conrad O. Gardner; B. A. Donahue

[57] ABSTRACT

An aircraft automatic braking system having a signal processor (20) for generating an autobrake valve control current (320) in response to deceleration selection switching means (30), main landing gear air/ground sensing switching means (60), and an inertial reference system (140) to control and limit the level of deceleration produced in the aircraft automatic braking system during the period after landing touchdown on the main gear and prior to nose-gear touchdown.

5 Claims, 1 Drawing Figure

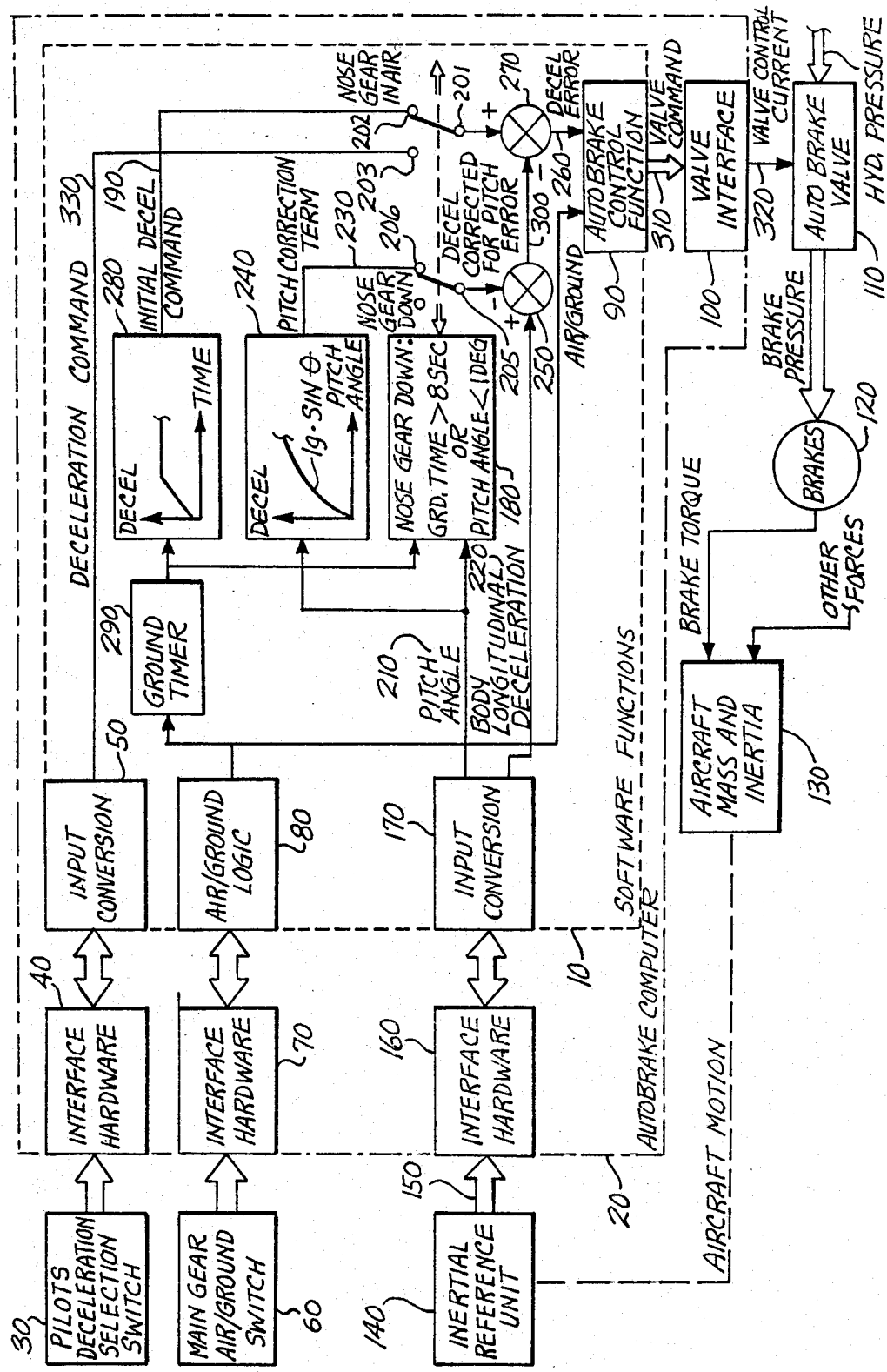

AIRCRAFT AUTOMATIC BRAKING SYSTEM

This invention relates to aircraft automatic braking systems and, more particularly, to aircraft automatic braking control during the time period between main-gear touchdown and nose-gear touchdown.

BACKGROUND OF THE INVENTION

Pitch command signals have been formulated heretofore as shown in U.S. Pat. No. 3,822,047 issued July 2, 1974. In contrast, a preferred embodiment of the present invention provides utilization of aircraft pitch angle data in an automatic braking system.

Heretofore, utilization of the autobrake system on aircraft has tended to derotate the aircraft following touchdown at a faster rate than would occur in a landing in which the pilot utilized manual brakes. This characteristic has been considered undesirable by some pilots since they feel that excessive elevator control is required to prevent a hard nose-gear touchdown. This problem has two roots:

(a) Brake application prior to nose-gear touchdown. Application of main-gear brakes will always impose a pitch-down moment on the aircraft. Present autobrake systems will apply brake pressure immediately after main-gear touchdown whereas a pilot will generally not apply manual brakes until after the nose gear is on the ground. Application of even low-to-moderate levels of braking will cause a rapid derotation of the aircraft if the nose gear is not yet on the ground and is unable to react the resultant pitch-down moment on the aircraft. The pitch-down moment prior to nose-gear touchdown can be reacted only by nose-up elevator control.

(b) Deceleration error due to pitch attitude. This particular problem is further aggravated by use of an accelerometer for feedback control of deceleration by the autobrake system. The accelerometer mounted parallel to the aircraft's longitudinal axis is sensitive to pitch attitude such that the indicated deceleration includes not only the deceleration due to change in aircraft velocity but also includes the component of the gravity vector which is resolved onto the aircraft's longitudinal axis. For small nose-up pitch angles, this gravity component is proportional to pitch angle and is opposite to the direction of travel such that the indicated deceleration is less than the actual deceleration. The deceleration error due to pitch attitude may be equal in magnitude to the commanded deceleration but opposite in sign and will cause the autobrake system to substantially increase the brake pressure in order to meet the commanded deceleration. This worsens the derotation characteristics of the autobrake system.

Prior attempts to solve the aforementioned problem resulted in:

(a) Brake application prior to nose-gear touchdown. Prior autobrake systems have provided a solution to this problem by commanding a fixed low value of deceleration prior to nose-gear touchdown, then commanding the pilot-selected deceleration after nose-gear touchdown.

These systems have utilized nose-gear squat switches to detect nose-gear touchdown. While the general approach of commanding a low deceleration level prior to nose-gear touchdown is satisfactory, use of a nose-gear squat switch to detect nose-gear touchdown is not possible on all present aircraft in that a nose-gear squat switch signal is not available to all the present autobrake systems. Additionally, nose-gear squat switches, when present, are installed in an exposed position and are prone to mechanical damage. The relatively high failure rate of the nose-gear squat switches, coupled with the difficulty of detecting the switch failure on a routine basis make it desirable to find an alternative to the nose-gear squat switch to determine nose-gear touchdown.

An attempt to simply delay braking until it could be assumed that the nose-gear touchdown had occurred has proven unsatisfactory in cases where the pilot brought the nose down rapidly in order to make a short landing roll due to the built-in delay in significant braking. This was also unsatisfactory in cases where the pilot held the nose up longer than the assumed touchdown time delay in that application of brakes at that time still caused a rapid derotation of the aircraft.

(b) Deceleration error due to pitch attitude. Certain prior autobrake systems utilized wheel speed rather than accelerometers to determine deceleration. As a result, these systems were not subject to a pitch attitude error. Reverting to a wheel-speed-derived deceleration signal would be unsatisfactory since a wheel deceleration signal is not as accurate as an accelerometer signal. An attempt has been made to use open-loop compensation for pitch attitude by assuming a fixed pitch angle for the landing flare attitude followed by a fixed derotation schedule. This approach was unsatisfactory in that it was not suited for cases where the pilot brought the nose down either faster or slower than the assumed derotation rate. A prior autobrake system utilizes an accelerometer for autobrake control but does not correct the deceleration data for pitch attitude.

As a consequence, it is an object of the present invention to provide an autobrake system for receiving aircraft pitch angle data from one of the aircraft's Inertial Reference Units (IRU) and then utilizing the pitch data to:

(a) Determine nose-gear touchdown. Nose-gear touchdown is assumed when the pitch angle is less than one degree. Prior to nose-gear touchdown, a preferred embodiment of the present autobrake system will increase the aircraft deceleration to some fixed low value over a period of several seconds. The deceleration level is selected to minimize the amount of elevator control required to counter the pitch-down moment due to braking while still providing a small amount of braking. After nose-gear touchdown the commanded deceleration level becomes that which was selected by the flight crew. Once pitch angle has become less than one degree, even momenterily, the autobrake computer will continue to assume nose-gear touchdown regardless of any subsequent increase in pitch angle to a value greater than one degree. A time-out is utilized to switch the autobrake control to the level commanded by the flight crew in case the nose is held off, or the indicated pitch attitude exceeds one degree for more than eight seconds following main-gear touchdown.

(b) Correct the indicated deceleration data for pitch attitude prior to nose-gear touchdown. This, in accordance with the present ihvention, eliminates the deceleration error arising from pitch attitude and prevents application of excessive braking due to this error, even though a low level of deceleration is commanded, during the derotation phase of the landing.

It is a further object of this invention to utilize pitch data to replace the need for a nose-gear squat switch and to eliminate the error due to pitch attitude in the deceleration data provided from the IRU.

It is another object of this invention to provide means for accurately controlling and limiting the level of deceleration produced by an aircraft automatic braking system during that period immediately after landing touchdown on the main gear and prior to nose-gear touchdown since excessive application of brake pressure while the nose gear is off the ground will produce a large nose-down pitching moment on the aircraft which can result in a high derotation rate objectionable to flight crew and passengers.

The foregoing, and other objects and advantages of this invention, will best be understood by the following detailed description of a preferred embodiment thereof taken in view of the accompanying drawing wherein:

BRIEF DESCRIPTION OF THE DRAWINGS

The Figure is a block diagram of a preferred embodiment of the present invention.

DETAILED DESCRIPTION OF THE DRAWING

Turning now to the Figure, the required automatic braking control functions 10 are executed within a signal processing means comprising e.g. an electronic computer 20 by a e.g. microprocessor which follows a fixed set of software instructions held in a read-only memory (ROM).

The automatic braking function is selected by the flight crew prior to landing by setting the deceleration selection switch 30 to the desired deceleration level. The switch position is sensed through interface hardware 40 and is converted to a deceleration command 330 by a software input conversion 50. Main landing gear ground sensing switches 60 are similarly sensed by a second set of interface hardware 70 and converted to air/ground status by software logic 80.

Automatic brake control 90 is initiated following a transition from the in-air condition to the on-ground condition. Brake control is achieved by applying a valve command 310 to the valve interface circuit 100 which generates an electrical control current 320. This control current is applied to an electrohydraulic servovalve 110. The servovalve, in turn, controls the hydraulic pressure applied to the aircraft wheel brakes 120. Application of brake pressure produces brake torque, and the resultant reacting force from the ground causes the aircraft mass 130 to decelerate.

The motion of the aircraft is sensed by an inertial reference unit 140 which computes, among other data, pitch angle and deceleration along the longitudinal body axis. Aircraft motion and position data is transmitted by the intertial reference unit on a digital data bus 150. The autobrake computer 20 receives this data through interface hardware 160 and processes the received data through input conversion logic 170 to extract the required pitch angle data 210 and body longitudinal deceleration data 220.

Nose-gear-down logic 180 modifies the control law while the aircraft nose is still in the air. During this time the deceleration command 330 is replaced by an initial deceleration on-ramp command 190 which is computed as a software function 280 based on time from touchdown. Time from touchdown is generated by a software function timer 290. This is shown schematically by a switch connecting terminal 201 to 202.

Also during this time, the received body longitudnal deceleration data 220 is corrected by a pitch correction term 230 to produce a term 300 which is deceleration corrected for pitch. The pitch correction term is required to remove errors due to the component of the earth's gravity vector acting on the inertial reference unit's horizontal accelerometer while the aircraft is in a nose-up pitch attitude. The pitch correction term 230 is computed as a software function 240 based on the gravitational constant, g, multiplied by an approximation to the sine of the pitch angle 210. The pitch correction is shown schematically as a switch connecting terminals 205 and 206 and as the summing point 250.

The difference between the initial deceleration command 190 and the deceleration corrected for pitch error 300 is the deceleration error 260. The autobrake control function 90 processes the deceleration error using conventional control techniques and generates valve commands 310 to force the deceleration error to zero.

The initial deceleration command function 280 is selected to minimize the amount of elevator control required to counter the pitch-down moment due to braking while still providing a small amount of braking.

The nose-gear-down logic 180 will return the control law to normal control after the pitch angle 210 has become less than 1.0 degree. If this does not occur within eight seconds of main-gear touchdown, as measured by the ground timer 290, then the control law will revert at that time to normal control for the remainder of the stop. This would be shown schematically by the switch opening between terminals 205 and 206, removing the pitch correction term, and by the switch transferring to connect terminal 201 to 203. The deceleration error 260 will then be computed as the difference between the pilot's deceleration command 330 and the measured body longitudinal deceleration 220. The autobrake control function 90 will adjust the commanded brake pressure in order to achieve the deceleration command.

What is claimed is:

1. In an aircraft automatic braking system having a preselected commanded deceleration level prior to touchdown of the main gear of the aircraft, a method of controlling the deceleration level of the aircraft automatic braking system comprising the steps of:

increasing deceleration level of the aircraft automatic braking system to a constant level for a plurality of seconds after main-gear touchdown to minimize the amount of elevator control required to counter the pitch-down moment due to braking of the aircraft while still providing a minimum level of braking of the aircraft;

determining nose-gear touchdown of the aircraft as a function of pitch angle; and then adjusting the deceleration level of said aircraft automatic braking system to said preselected commanded deceleration level upon determining nose-gear touchdown of the aircraft.

2. The invention according to claim 1 wherein nose-gear touchdown is determined at a pitch angle of the aircraft of less than one degree.

3. The invention according to claim 1 further including returning control of the deceleration of said automatic braking system to said automatic braking system in the event nose-gear touchdown of the aircraft is not determined to occur within a predetermined time period subsequent to main-gear touchdown.

4. The invention according to claim 3 wherein said predetermined time period is about eight seconds.

5. An aircraft automatic braking control system having means including deceleration selection switching means (30) for providing a deceleration command signal (330), means including main landing gear air/ground switching means (60) for providing signals representative of air/ground status of the main landing gear of the aircraft to initiate autobrake control function (90) of said aircraft automatic braking control system, the improvement comprising in combination:

an inertial reference unit (140) for providing signals representative of pitch angle (210) and aircraft longitudinal deceleration (220);

means including timing means (290) for providing signals representative of time from main-gear touchdown;

means (280) responsive to said signals representative of time from main-gear touchdown for providing initial deceleration on-ramp command signals (190);

means (240) responsive to said signals representative of pitch angle (210) for providing a pitch correction term signal (230);

nose-gear-down logic circuit means (180) responsive to said signals representative of pitch angle (210) and said signals representative of time from main-gear touchdown for controlling and combining said initial deceleration on-ramp command signals (190), said deceleration command signal (330), and said pitch correction term signal (230) with said signals representative of aircraft body longitudinal deceleration (220) to provide a signal representative of deceleration error (260).

* * * * *